2,961,446

2-[DI-(LOWER ALKYL) AMINOETHYLTHIO]-4-LOWER ALKYL-THIAZOLE-5-CARBOXYLIC ACID LOWER ALKYL ESTERS

Marion W. Harman and John J. D'Amico, Nitro, W. Va., assignors to Monsanto Chemical Company, St. Louis, Mo., a corporation of Delaware No Drawing. Original application Mar. 29, 1956, Ser. No. 574,612, now Patent No. 2,900,299, dated Aug. 18, 1959. Divided and this application Aug. 11, 1958, Ser. No. 758,639

2 Claims. (Cl. 260—302)

The present invention relates to new chemical products and to the use of the products as fungicides, especially for the control of wheat rust. More particularly, the invention relates to non-arylene 2-mercaptothiazoles in which the hydrogen of the mercapto group has been replaced by an aminoethyl group, preferably a lower alkylaminoethyl group, as for example 2-dimethylaminoethyl, 2-diethylaminoethyl, 2-dipropylaminoethyl, 2-dibutylaminoethyl and 2-(4-morpholinylethyl) radicals. Such compounds may conveniently be represented by the general formula

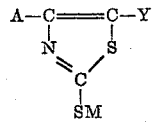

wherein M represents an aminoethyl group and A and Y are selected from a group consisting of hydrogen, lower alkyl and carbonyl radicals. Carbonyl radicals are characterized by the presence of a C=O linkage, such radicals comprising, by way of example, acetyl, benzoyl, carbomethoxy, carbethoxy and amido radicals.

The compounds may be prepared by reacting the mercaptothiazole, conveniently in aqueous alkaline solution, with a 2-chloroethylamine. Suitable mercaptothiazoles have, for the most part, been described in the literature and include 2-mercapto 4-ethylthiazole, 2-mercapto 4,5-dimethylthiazole, 2-mercapto 4-methylthiazole, 2-mercapto 4,5-diethylthiazole and 2-mercapto 4-methyl 5-thiazolecarboxylate.

The method of preparation and the application of the products as fungicides, as exemplified by control and destruction of wheat rust, will be understood from the following description and examples of the invention. Since the production procedure is of wide application, it is to be understood that many analogous products to those specifically described are capable of production and are within the scope of the claims.

Example 1

Typical of the procedure followed for the production of the new class of chemicals is the following procedure whereby 2-(2-dimethylaminoethylthio)-4-methyl-5-thiazolylmethyl ketone, of the following structure, is produced:

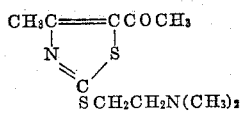

Into an agitated mixture of 86.6 parts (0.5 mole) of 2-mercapto-4-methyl-5-thiazolyl methyl ketone, 500 parts of water and 80 parts (0.5 mole) of 25% caustic soda solution there was added a mixture of 72 parts (0.5 mole) of 2-chloro-N,N-dimethylethylamine hydrochloride and 80 parts (0.5 mole) of 25% caustic soda. The stirred reaction mixture was then heated at 50–60° C. for about 5 hours and thereafter was allowed to cool to about 25° C. The cooled reaction mixture was then extracted with about 500 parts of diethyl ether and the ether extract washed with several successive portions of water or until the wash waters were neutral in reaction. The oily product was then dried over a suitable agent such as anhydrous sodium sulfate, and the residual ether removed by vacuum drying or distillation under 1–2 mm. pressure and not above 80–90° C. An amber colored oil resulted, which on analysis was found to contain 11.37% nitrogen. Theory nitrogen content for a product of the formula $C_{10}H_{16}N_2OS_2$ is 11.46%. The product is insoluble in water and heptane, is soluble in ether, acetone and chloroform and in hot benzene, ethyl acetate and ethyl alcohol.

Example 2

Following the procedure as described in Example 1, but reacting a charge comprising 32.8 parts (0.25 mole) of 4-methyl-2-mercaptothiazole in 500 parts of water containing 40 parts (0.25 mole) of 25% caustic soda solution treated with 36 parts (0.25 mole) of 2-chloro-N,N-dimethylethylamine in 40 parts (0.25 mole) of 25% caustic soda solution, there again was produced an amber oil which on analysis gave 13.73% nitrogen as compared to 13.85% calculated for $C_8H_{14}N_2S_2$. The 4-methyl-2-(2-dimethylaminoethylthio) thiazole has the structure

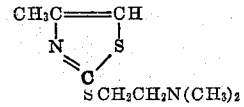

and exhibited the same solubility characteristics as did the product of Example 1.

Example 3

As another example of the new class of chemicals, ethyl 4-methyl-2-(2-dimethylaminoethylthio)-5-thiazole carboxylate was obtained by reacting a mixture of 50.3 parts (0.25 mole) of ethyl 2-mercapto-4-methyl-5-thiazole carboxylate contained in 225 parts by weight of ethyl alcohol and 32.2 parts of 87% caustic potash with 36 parts (0.25 mole) of 2-chloro-N,N-dimethylethylamine hydrochloride. The mixture of the reactants shown was stirred and maintained at 25–30° C. for about 24 hours and was then filtered to remove the salt present. Excess alcohol was thereupon removed by evaporation in vacuo. The residue was then dissolved in 600 parts of chloroform and the chloroform solution was washed with water until the washings were neutral to litmus. The product was then dried by suitable means, such as anhydrous sodium sulfate, and the chloroform removed by distillation under vacuum. The product is an amber oil, exhibiting the same solvent characteristics as the product of Example 1, and on analysis was found to contain 23.85% sulfur. Theory sulfur content of a product of the formula $$C_{11}H_8N_2O_2S_2$$

is 23.37%. The structure of the product is represented as follows:

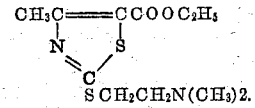

Example 4

As another example of the invention, 4-methyl-2-(2-dimethylaminoethylthio)-5-thiazolecarboxamide hydrate of the structure

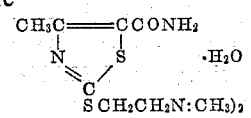

was obtained by reacting a mixture of 69.6 parts (0.4 mole) of 2-mercapto-4-methyl-5-thiazole carboxamide in 500 parts of water and 57.6 parts (0.4 mole) of 2-chloro-N,N-dimethylethylamine hydrochloride in 64 parts (0.4 mole) of 25% caustic soda solution. The entire mixture as shown was stirred while maintaining at a temperature of 25–30° C. for about 24 hours and then was cooled while stirring to a temperature of 0–5° C. and maintained thereat for about 2 hours. The precipitate that resulted was filtered and washed with several small portions of cold water, was then air dried and after recrystallization from water was found to melt at 114–115° C. The tan colored crystals were soluble in hot water and alcohol but insoluble in ether, acetone, chloroform and acetone. On analysis the product was found to contain 15.31% nitrogen and 23.72% sulfur as compared to 15.96% nitrogen and 24.34% sulfur calculated for $C_9H_{15}N_3O_2S_2 \cdot H_2O$. This compound inhibited *Aspergillus niger* at a dilution of 1:1,000 but was not a rust eradicant.

*Example 5*

As still another example of the invention, 4-methyl-2-(2-dimethylaminoethylthio)-5-thiazolecarboxanilide was prepared. This product of the structure

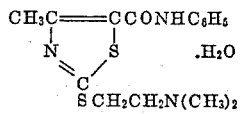

was obtained by reacting 100 parts (0.4 mole) of 2-mercapto-4-methyl-5-thiazolecarboxanilide in 400 parts of water and 64 parts (0.4 mole) of 25% caustic soda solution with 57.6 parts (0.4 mole) of 2-chloro-N,N-dimethylethylamine hydrochloride and 64 parts (0.4 mole) of 25% caustic soda solution. The mixture of the above-named reactants were stirred for about 24 hours while maintaining a temperature of 25–30° C. Thereupon the mixture was cooled slightly and extracted with about 700–750 parts of chloroform, the chloroform solution was washed with water until the water washings were neutral to litmus, whereupon the solution was dried over an anhydrous medium such as anhydrous sodium sulfate. After the drying step the chloroform was removed by vacuum distillation and a tan solid melting at 92–94° C. was obtained. The product was soluble in chloroform and ethyl alcohol, in hot ethyl acetate and hot acetone but insoluble in water, ether, benzene and heptane. On analysis the product was found to contain 12.43% nitrogen and 18.89% sulfur as compared to 12.38% nitrogen and 18.89% sulfur calculated for $C_{15}H_{19}N_3OS_2 \cdot H_2O$.

*Example 6*

As another example of the invention, ethyl 2-(2-dimethylaminoethylthio)-4-thiazole carboxylate, of the structure

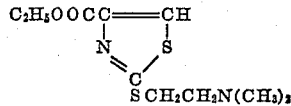

was obtained. For the preparation of this product, ethyl 2-mercapto-4-thiazole carboxylate was required, which material was obtained by adding 48.8 parts (0.25 mole) of the ethyl ester of bromoacetyl glyoxylic acid in a single portion to a solution of 27.6 parts (0.25 mole) of ammonium dithiocarbamate in 150 parts of ethyl alcohol. A sharp temperature rise of about 40° ensued. The mixture was stirred at room temperature for about 24 hours and then heated at 70–80° C. for about 2 hours. After cooling to about 10° C., 300 parts of water was added and the product filtered, the solid washed with cold water and air dried. The crystals after purification from alcohol melted at 131–132° C. By analysis of the crystals there was found 7.38% nitrogen and 33.98% sulfur as compared with 7.40% nitrogen and 33.88% sulfur calculated for $C_6H_7NO_2S_2$.

To 47.3 parts of the ethyl 2-mercapto-4-thiazole carboxylate so prepared in 400 ml. acetone was added 16.1 parts (0.25 mole) of 87% potassium hydroxide solution, 36 parts (0.25 mole) of 2-chloro-N,N-dimethylethylamine hydrochloride and 40 parts (0.25 mole) of 25% sodium hydroxide solution. After stirring at room temperature for 24 hours and filtering, the acetone was removed in vacuo and a viscous oily product was obtained soluble in acetone, chloroform and benzene but insoluble in water and ether. Analysis gave 10.78% nitrogen and 24.34% sulfur as compared with 10.76% nitrogen and 24.63% sulfur calculated for $C_{10}H_{16}N_2O_2S_2$.

Typical of the effectiveness of the products of the present invention as fungicides is the action of the new materials in protecting against the destructive action of the organism *Puccinia rubigo-vera tritici*. In demonstrating this effectiveness a rust susceptible variety of wheat (Seneca) is planted in small clay pots filled with soil. About ten seeds are normally planted in each pot so to insure availability of five uniform plants for the test. The pots are held in a greenhouse at 75° F. and watered daily until the seedlings were six days old. Thereupon the seedlings were sprayed with water by means of an atomizer and "bloom" removed from the leaves by gentle rubbing. Then rust spores were transferred to the leaves and rubbed up and down the leaves. Four days after inoculation with rust spores, the plants were sprayed with solutions of the chemical under test, prepared in concentrations of from 1 to 5 parts chemical to 1000 parts of water which may contain a small quantity (5 parts) of acetone if the chemical is not water soluble. A trace of a suitable spreading or wetting agent preferably is also present. The plants are sprayed in duplicate tests using 10 cc. of the test solution per pot. After treatment as described, the pots are held in the greenhouse for a week and examined and graded as to the number and size of pustules formed on the leaves. The products of Examples 2 and 3 hereinbefore described, taken as typical of the products herein disclosed, in concentrations between 1 to 5 parts per 1000, that is of from 0.1 to 0.5% by weight, showed good results as foliage eradicants of wheat rust. There was also from no to very slight injury of the leaves so the products are not phytotoxic as well as being good fungicides.

It is intended to cover all changes and modifications of the examples of the invention herein chosen for purposes of disclosure which do not constitute departures from the spirit and scope of the invention.

This application is a division of application Serial No. 574,612, now Patent No. 2,900,299.

What is claimed is:

1. A compound of the structure

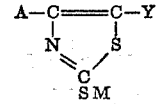

where A represents a lower alkyl group, Y represents a lower carboalkoxy radical and M represents a di-(lower alkyl)aminoethyl group.

2. As a new product ethyl 4-methyl 2-(2-dimethylaminoethylthio)-5-thiazole carboxylate.

References Cited in the file of this patent

UNITED STATES PATENTS

| 2,424,175 | Mathes et al. | July 15, 1947 |
| 2,721,868 | D'Amico | Oct. 25, 1955 |

OTHER REFERENCES

Creed et al., Ind. Eng. Chem., vol. 46, pp. 808–816 (1954).